United States Patent
Sakuma (10) Patent No.: US 12,352,978 B2
(45) Date of Patent: Jul. 8, 2025

(54) WEARABLE DISPLAY DEVICE

(71) Applicant: SEIKO EPSON CORPORATION, Tokyo (JP)

(72) Inventor: Wataru Sakuma, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 505 days.

(21) Appl. No.: 17/853,927

(22) Filed: Jun. 30, 2022

(65) Prior Publication Data
US 2023/0004010 A1  Jan. 5, 2023

(30) Foreign Application Priority Data
Jul. 1, 2021 (JP) .................. 2021-110105

(51) Int. Cl.
*G02B 27/01* (2006.01)

(52) U.S. Cl.
CPC ..... *G02B 27/0176* (2013.01); *G02B 27/0172* (2013.01)

(58) Field of Classification Search
CPC .............. G02B 27/0101; G02B 27/017; G02B 2027/0118; G02B 2027/012; G02B 2027/0121; G02B 2027/015; G02B 27/283; G02B 2027/0112; G02B 27/0176; G02B 27/0172; B60R 2300/205; G03B 21/604; G06F 3/011; G06F 3/013; G06F 1/163
See application file for complete search history.

(56) References Cited

U.S. PATENT DOCUMENTS

| 2016/0062457 A1* | 3/2016 | Kobayashi | G06F 3/013 345/156 |
| 2021/0132398 A1 | 5/2021 | Fujishiro | |

FOREIGN PATENT DOCUMENTS

| CN | 112748574 | 5/2021 |
| JP | 2016212320 | 12/2016 |

* cited by examiner

*Primary Examiner* — Mariam Qureshi
(74) *Attorney, Agent, or Firm* — JCIPRNET (57) ABSTRACT

A wearable display device including a mounting unit, an image display unit that displays an image, a frame that supports the image display unit; an imaging unit that is supported by the frame and that captures an external scene, a coupling unit that connects the frame and the mounting unit in a manner that a position of the image display unit with respect to the mounting unit changes from one side to another side in a first direction, and a driving unit that changes an angle of the imaging unit to tilt the imaging unit toward the one side in the first direction when the position of the image display unit is changed from the one side to the other side in the first direction.

6 Claims, 5 Drawing Sheets

WEARABLE DISPLAY DEVICE

The present application is based on, and claims priority from JP Application Serial Number 2021-110105, filed Jul. 1, 2021, the disclosure of which is hereby incorporated by reference herein in its entirety.

BACKGROUND

1. Technical Field

The present disclosure relates to a wearable display device.

2. Related Art

Previously, a head mounted display (HMD) is known as a wearable display device that is detachably worn by a user on a head and directly projects an image displayed on an image display unit onto the eyes of the user. The HMD is used in a wide variety of applications, for example, as a display device for remote assistance of an industrial device, a medical device, etc., in addition to viewing content video such as a DVD or a video.

For example, in a case where an instruction is received from a support person at a remote place, a worker wears an HMD including a camera, and images an external scene including a target subject with the camera. When the external scene imaged by the camera is displayed on a monitor, etc., on the support person side, assistance from a remote place is performed in which an appropriate instruction is provided from the support person to the worker by voice or video.

In a case where the worker performs actual work, when the image display unit is disposed in front of the eye, a field of view of the worker is blocked and efficiency of the work is reduced. Therefore, it is desirable to move the image display unit to a position away from the eyes of the worker. For example, JP-A-2016-212320 discloses an HMD that can be moved from a position corresponding to the eyes of a worker to a position outside the field of view by flipping up an image display unit while the HMD is worn.

However, in the HMD disclosed in JP-A-2016-212320, the camera is provided at the image display unit, and thus when the image display unit is flipped up, the camera moves together with the image display unit. At this time, since the range of the external scene imaged by the camera changes before and after the image display unit is flipped up, the subject of the work is deviated from the imaging range of the camera. Therefore, there is a problem that the external scene imaged after the image display unit is flipped up is not intended by a support person at a remote place.

SUMMARY

In order to solve the problem described above, according to a first aspect of the present disclosure, there is provided a wearable display device including a mounting unit, an image display unit that displays an image, a frame that supports the image display unit, an imaging unit that is supported by the frame and that captures an external scene, a coupling unit that connects the frame and the mounting unit in a manner that a position of the image display unit with respect to the mounting unit changes from one side to another side in a first direction, and a driving unit that changes an angle of the imaging unit to tilt the imaging unit toward the one side in the first direction when the position of the image display unit is changed from the one side to the other side in the first direction.

DESCRIPTION OF EXEMPLARY EMBODIMENTS

An exemplary embodiment of the present disclosure will be described in detail below with reference to the accompanying drawings.

Note that, in the drawings used for the following descriptions, characteristic portions are expanded for convenience to make characteristics easily comprehensible in some cases, thus dimension ratios among respective constituent elements or the like are not necessarily the same as actual dimension ratios.

First Exemplary Embodiment

A wearable display device according to the present exemplary embodiment is an example of a head mounted display used by being worn on a head. In the description below, the term "Head Mounted Display" is abbreviated as "HMD". The HMD according to the present exemplary embodiment is used for operation on an industrial device or a medical device, for example, and is worn by a worker on a head receiving an instruction from a support person at a remote place.

In each of the following drawings, an XYZ orthogonal coordinate system is configured to describe a configuration and positional relationship of each member. In the following description, unless otherwise specified, the terms "front", "rear", "left", "right", "up", and "down" refer to the respective directions as viewed from the worker wearing the HMD. For example, the X-axis corresponds to an axis along the front-rear direction of the worker, the Y-axis corresponds to an axis along the left-right direction of the worker, and the Z-axis corresponds to an axis along the vertical direction of the worker. In the present specification, a +X side corresponds to a front side of the worker, a −X side corresponds to a rear side of the worker, a +Y side corresponds to a right side of the worker, a −Y side corresponds to a left side of the worker, a +Z side corresponds to an upper side of the worker, and a −Z side corresponds to a lower side of the worker, respectively. Also, hereinafter, the directions are referred to as the front-rear direction X, the left-right direction Y, and the vertical direction Z. In this specification, the front-rear direction X corresponds to a "third direction", the left-right direction Y corresponds to a "second direction", and the vertical direction Z corresponds to a "first direction".

Figure 1A:
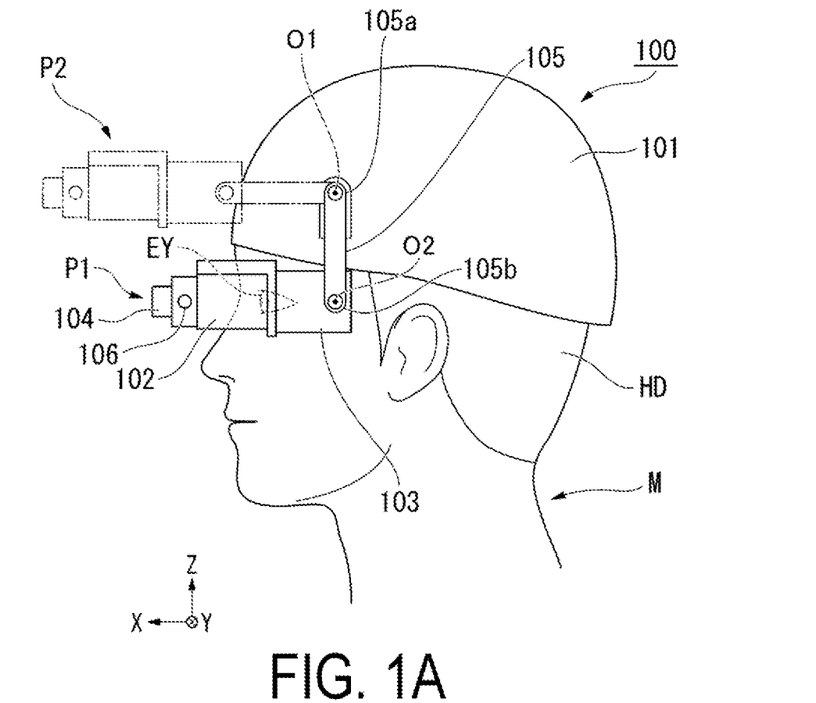
FIG. 1A is a diagram illustrating a usage state of an HMD of a first exemplary embodiment.
Figure 1B:
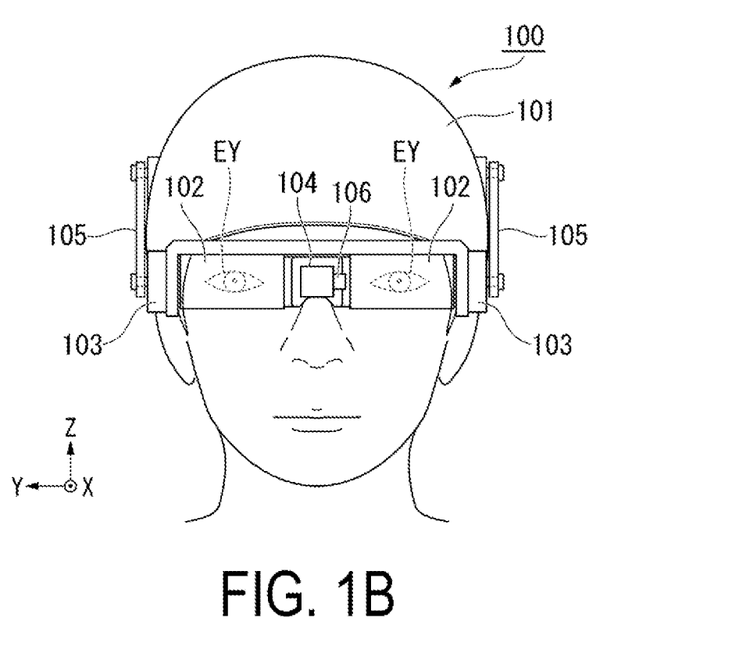
FIG. 1B is a front view illustrating a configuration of a main part of the HMD.

FIG. 1A is a diagram illustrating a usage state of an HMD 100 of the present exemplary embodiment. FIG. 1B is a front view illustrating a configuration of a main part of the HMD 100. As illustrated in FIG. 1A, the HMD 100 according to the present exemplary embodiment is used in a state of being worn on a head HD of a worker M. The worker M visually recognizes an image displayed at an image display unit 102.

As illustrated in FIGS. 1A and 1B, the HMD 100 of the present exemplary embodiment includes a mounting unit 101, the image display unit 102, a frame 103, an imaging unit 104, a coupling unit 105, and a driving unit 106.

The mounting unit 101 is a member for mounting the HMD 100 on the head HD of the worker M. The mounting unit 101 of the present exemplary embodiment has a helmet shape covering the entire head HD of the worker M, but the shape of the mounting unit 101 is not limited thereto. For example, it can be a hair band shape worn on the head HD of the worker M. In this case, the hair band shape is configured by a mounting base portion provided on the +X side of the head HD of the worker M and a belt portion linked to the mounting base portion.

The image display unit 102 displays images corresponding to both eyes EY of the worker M. The image displayed at the image display unit 102 is, for example, an image related to a work transmitted from a support person (hereinafter, simply referred to as an operator) at a remote place. The worker M can perform smooth operation by being assisted by the operator with reference to the image displayed at the image display unit 102.

Note that the image display unit 102 may be a see-through type (transmission type), or may be non-transmission type. The HMD 100 of the present exemplary embodiment includes a see-through type image display unit 102, and the worker M can visually recognize an external scene via the image display unit 102 together with the image displayed at the image display unit 102.

The frame 103 supports the image display unit 102 and the imaging unit 104. As the imaging unit 104, for example, a small imaging element such as a CCD camera is used. The imaging unit 104 is pivotably supported with respect to the frame 103.

The driving unit 106 is configured with a motor, for example. The driving unit 106 rotates a shaft portion of the imaging unit 104 supported by the frame 103 to change an orientation of the imaging unit 104 with respect to the image display unit 102 supported by the frame 103. In the present exemplary embodiment, the imaging unit 104 is pivotable in the vertical direction Z about a rotational axis along the left-right direction Y.

The coupling unit 105 is a member that couples the frame 103 and the mounting unit 101 such that the position of the image display unit 102 with respect to the mounting unit 101 in the vertical direction Z is changeable. The coupling unit 105 rotates about a rotational axis extending in the left-right direction Y orthogonal to the vertical direction Z, and thus changes the position of the image display unit 102 with respect to the mounting unit 101 in the vertical direction Z. In the present exemplary embodiment, as illustrated in FIG. 1B, the coupling units 105 are provided on both sides of the frame 103 in the left-right direction Y. Note that the number and mounting positions of the coupling units 105 are not limited thereto.

In the present exemplary embodiment, the coupling unit 105 includes a first linkage portion 105a linked to the mounting unit 101 and a second linkage portion 105b linked to the frame 103. The first linkage portion 105a is rotatably linked to the mounting unit 101 about a first rotational shaft O1 extending in the left-right direction Y. The second linkage portion 105b is rotatably linked to the frame 103 about a second rotational shaft O2 extending in the left-right direction Y.

The coupling unit 105 changes the position of the image display unit 102 with respect to the mounting unit 101, between a first position P1 located on the lower side (−Z side) which is one side in the vertical direction Z and a second position P2 located on the upper side (+Z side) which is the other side in the vertical direction Z. In the case of the present exemplary embodiment, the rotation operation of the coupling unit 105 is performed manually, but the operation of rotating the coupling unit 105 may be performed by using a driving unit (not illustrated).

In the present exemplary embodiment, as illustrated in FIG. 1A, the image display unit 102 is disposed in front of the eye EY of the worker M when the image display unit 102 is located at the first position P1 with respect to the mounting unit 101. Additionally, the image display unit 102 is disposed at a position that is retracted upward from the eye EY of the worker M when the image display unit 102 is located at the second position P2 with respect to the mounting unit 101.

By moving the image display unit 102 from the first position P1 to the second position P2, the HMD 100 of the present embodiment can be easily switched between a state in which the image display unit 102 is disposed in front of the eye EY of the worker M and a state in which the image display unit 102 is moved upward from the front of the eye EY of the worker M (a state indicated by a two dot chain line). Hereinafter, a state in which the image display unit 102 is moved from the first position P1 to the second position P2 by being flipped up is referred to as "flip-up".

For example, when the worker M lifts the frame 103 diagonally upward, the first linkage portion 105a rotates to the one side (upper side) about the first rotational shaft O1, so that the coupling unit 105 moves upward. At this time, the frame 103 linked to the second linkage portion 105b of the coupling unit 105 is rotated downward about the second rotational shaft O2. Then, the image display unit 102 is brought into a flip-up state by moving up until the coupling unit 105 becomes parallel to the front-rear direction X.

In the HMD 100 according to the present exemplary embodiment, in a state in which the image display unit 102 is flip-up, a fixing mechanism is employed that fixes the positions of the mounting unit 101 and the first linkage portion 105a and the positions of the frame 103 and the second linkage portion 105b. In this manner, when the image display unit 102 is flip-up, the image display unit 102 is stably supported by the fixing mechanism. Accordingly, it is possible to suppress the position of the image display unit 102 from being shifted, and the work of the worker M is not disturbed.

Figure 2:
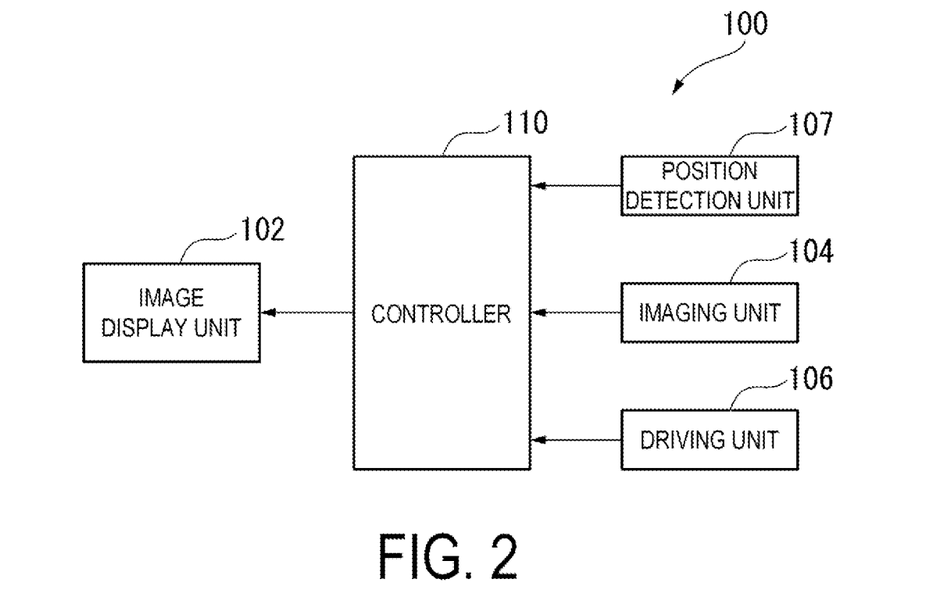
FIG. 2 is a block diagram illustrating an electrical configuration of the HMD.

FIG. 2 is a block diagram illustrating an electrical configuration of the HMD 100 of the present exemplary embodiment.

As illustrated in FIG. 2, the HMD 100 according to the present exemplary embodiment further includes a controller (control unit) 110 that controls operation of each configuration, and a position detection unit 107. The controller 110 is electrically coupled to the image display unit 102, the imaging unit 104, the driving unit 106, and the position detection unit 107. The controller 110 of the present exemplary embodiment functions as a control unit for controlling the drive of the entire HMD 100.

In the present exemplary embodiment, the controller 110 controls the inclination of the imaging unit 104 by driving the driving unit 106 based on the position of the image display unit 102 with respect to the mounting unit 101.

The position detection unit 107 is a sensor that detects a position of the image display unit 102 with respect to the mounting unit 101. In a case of the present exemplary embodiment, the position detection unit 107 is provided, for example, at a position facing the eyebrows of the worker M in the frame 103. The position detection unit 107 includes, for example, a photo sensor. The position detection unit 107 detects the state before the flip-up by receiving the reflected light from the worker M, and detects the state after the flip-up by not receiving the reflected light from the worker M. In this manner, the position detection unit 107 can detect a change in the position of the image display unit 102 before and after the flip-up. Note that a gyro sensor or a magnetic sensor may be used as the position detection unit 107.

The imaging unit 104 images the external scene including a subject to work by the worker M. The imaging unit 104 of the present exemplary embodiment has a focus function for adjusting a focus to the subject of work. In the present exemplary embodiment, the imaging unit 104 can acquire a distance from the imaging unit 104 to the subject to work by the worker M by using the focus function. The imaging unit 104 transmits, to the controller 110, data related to the distance to the target subject along with the image of the imaged external scene.

The controller 110 transmits an image of the external scene transmitted from the imaging unit 104 to a host device (not illustrated), for example, by radio. The host device is installed on the operator side on the remote place, and causes the display device to display the external scene imaged by the imaging unit 104.

In this manner, the operator visually recognizes the external scene imaged by the imaging unit 104, and accurately grasps the subject to work by the worker M while being in a remote place, so that the operator can provide an appropriate work instruction to the worker M.

Incidentally, it is assumed that the worker M flips up the image display unit 102 in order to secure a field of view during work. By flipping up the image display unit 102, the frame 103 that supports the image display unit 102 is also flipped up upward. Therefore, when the image display unit 102 is flipped up, the frame 103 is also flipped up, so that the position of the imaging unit 104 supported by the frame 103 changes upward as illustrated in FIG. 1A.

When the position of the imaging unit 104 changes, the positional relationship between the imaging unit 104 and the target subject changes, and thus the external scene imaged by the imaging unit 104 may also change. When the external scene imaged by the imaging unit 104 changes in this manner, the image of the external scene displayed at the display device on the operator side also changes, so the operator may not provide an appropriate instruction for the worker M.

In contrast, in the HMD 100 according to the present exemplary embodiment, when the position of the image display unit 102 with respect to the mounting unit 101 is changed from the one side (first position P1) to the other side (second position P2) in the vertical direction Z due to the flip-up, the controller 110 drives the driving unit 106 to tilt the imaging unit 104 toward the second position P2 side in the vertical direction Z. As a result, even when the position of the imaging unit 104 changes before and after the flip-up, an external scene similar to that before the flip-up can be imaged by the imaging unit 104.

Hereinafter, in the HMD 100 according to the present exemplary embodiment, a technique for imaging a similar external scene before and after the flip-up by the imaging unit 104 is specifically described.

Figure 3:
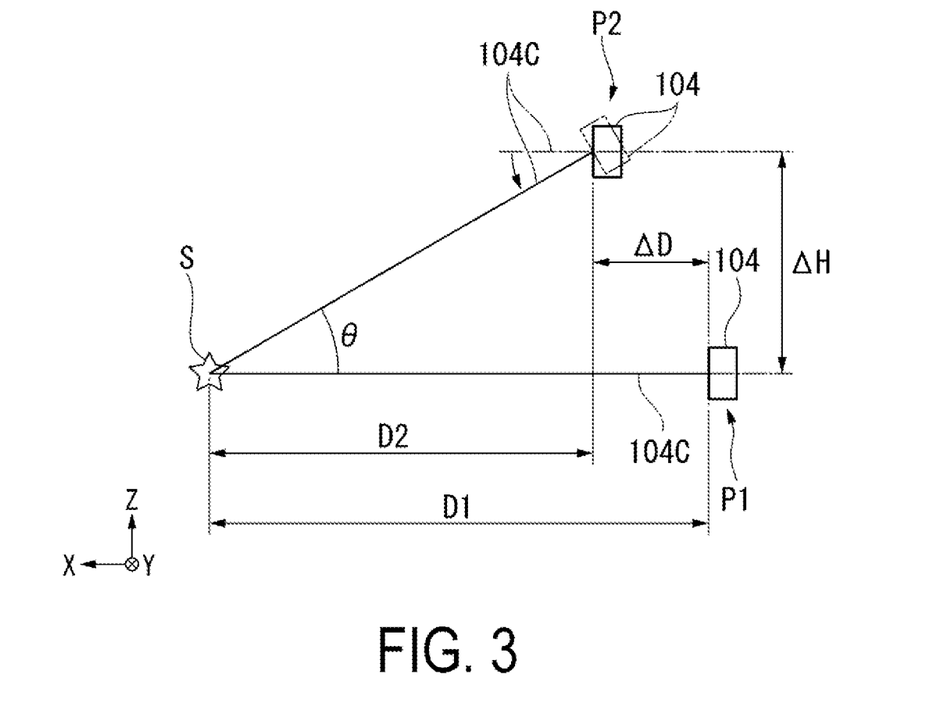
FIG. 3 is a conceptual diagram illustrating a change in a position of an imaging unit before and after flip-up.

FIG. 3 is a conceptual diagram illustrating a change in a position of the imaging unit 104 before and after the flip-up.

In FIG. 3, when the image display unit 102 is located at the first position P1 (before the flip-up), the distance from the imaging unit 104 to the subject S to work by the worker M is D1. When the image display unit 102 is located at the second position P2 (after the flip-up), the distance from the imaging unit 104 to the subject S to work by the worker M is D2.

In FIG. 3, when the position of the image display unit 102 changes from the first position P1 to the second position P2 (before and after the flip-up), a positional change amount of the imaging unit 104 in the vertical direction Z is ΔH. In the present exemplary embodiment, the positional change amount ΔH in the vertical direction Z of the imaging unit 104 before and after the flip-up is a constant determined in accordance with a design value of the HMD 100.

Additionally, in FIG. 3, a positional change amount in the front-rear direction X of the imaging unit 104 before and after the flip-up is ΔD. In the present exemplary embodiment, the positional change amount ΔD in the front-rear direction X of the imaging unit 104 before and after the flip-up is a constant determined in accordance with the design value of the HMD 100.

Additionally, in FIG. 3, an angle formed between the imaging unit 104 and the subject S after the flip-up is θ. Note that the angle θ formed between the imaging unit 104 and the subject S corresponds to an angle formed between a central optical axis 104C of the imaging unit 104 and the center of the subject S.

Note that in FIG. 3, for ease of explanation, the inclination of the central optical axis 104C of the imaging unit 104 is not changed before and after the flip-up. That is, as illustrated in FIG. 3, before and after the flip-up, the central optical axis 104C of the imaging unit 104 is assumed to be parallel to the front-rear direction X.

As illustrated in FIG. 1A, the HMD 100 according to the present exemplary embodiment is in a state in which the imaging unit 104 protrudes to the front side (+X side) during the flip-up due to its structure.

That is, as illustrated in FIG. 3, the positional change amount ΔD in the front-rear direction X of the imaging unit 104 before and after the flip-up is a negative value, that is, "ΔD=−D". Therefore, the distance D2 from the imaging unit 104 to the subject S after the flip-up is defined by "D2=D1−D".

Here, a case where the imaging unit 104 after flip-up (the second position P2) is tilted toward the subject S side will be considered. Specifically, when the imaging unit 104 is tilted toward the subject S by the angle θ formed by the imaging unit 104 and the subject S after the flip-up, the central optical axis 104C of the imaging unit 104 can be matched with the center of the subject S, similar to that before the flip-up. Thus, even after the flip-up, the imaging unit 104 can accurately image the subject S.

The HMD 100 according to the present exemplary embodiment calculates the angle θ formed between the imaging unit 104 and the subject S after the flip-up, and the controller 110 controls the inclination of the imaging unit 104 based on the calculated angle θ.

Hereinafter, a method for controlling the inclination of the imaging unit 104 by the controller 110 is described based on the flowchart illustrated in FIG. 4. Hereinafter, a case in which the inclination of the imaging unit 104 is controlled when the image display unit 102 performs flip-up operation of moving from the first position P1 to the second position P2 will be described.

Figure 4:
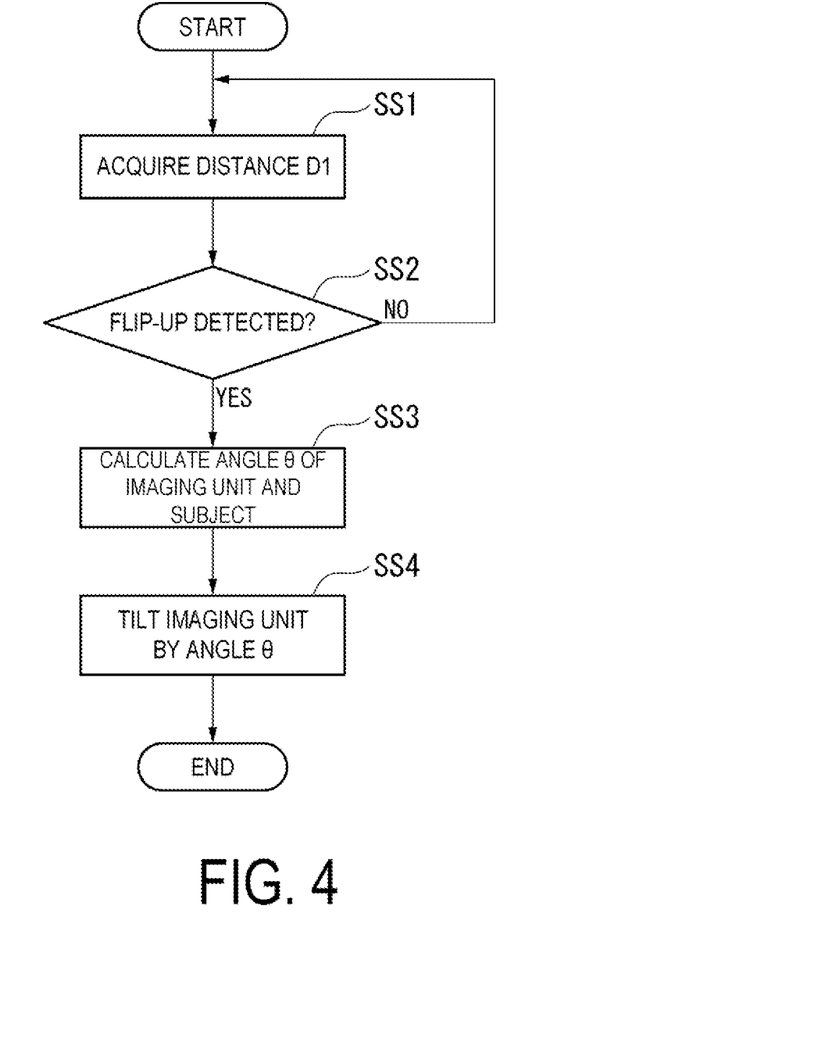
FIG. 4 is a flowchart illustrating a control method related to an inclination of the imaging unit.

First, in step SS1 illustrated in FIG. 4, the controller 110 acquires the distance D1 from the imaging unit 104 to the subject S before the flip-up illustrated in FIG. 3. In the HMD 100 according to the present exemplary embodiment, the controller 110 acquires the distance D1 from the imaging unit 104 to the subject S by the above-described focusing performed on the subject S by the imaging unit 104. In the present exemplary embodiment, for example, the distance D1 is 0.5 m.

Subsequently, in step SS2 illustrated in FIG. 4, the controller 110 proceeds to step SS3 when the flip-up is detected based on the detection result of the position detection unit 107 (in the case of YES). On the other hand, the controller 110 returns to step SS1 when the flip-up is not detected based on the detection result of the position detection unit 107 (in the case of NO).

In step SS3 illustrated in FIG. 4, the controller 110 calculates the angle θ formed between the imaging unit 104 and the subject S illustrated in FIG. 3. The angle θ is calculated based on Mathematical Equation 1 below. Note that, in Mathematical Equation 1, the positional change amount ΔH and the positional change amount ΔD are constants that depend on the design value of the HMD 100 as described above, and thus are stored in advance on the controller 110.

$$\theta = \cos^{-1}\left(\frac{(D1 + \Delta D)}{\sqrt{D2^2 + \Delta H^2}}\right)$$ [Mathematical Equation 1]

In the present exemplary embodiment, for example, the distance change amount ΔD is 0.02 m, and the positional change amount ΔH is 0.07 m. That is, the distance D2 is 0.48 m. In this case, the controller 110 calculates the angle θ as "8.30°", and proceeds to step SS4.

In step SS4 illustrated in FIG. 4, the controller 110 drives the driving unit 106 and tilts the imaging unit 104 by the angle θ.

Accordingly, when the imaging unit 104 indicated by the two dot chain line in FIG. 3 is tilted toward the subject S so that the central optical axis 104C is directed toward the subject S, the central optical axis 104C of the imaging unit 104 can be matched with the center of the subject S in the same manner as before the flip-up. The imaging unit 104 can image the subject S in an in-focus state by the focus function.

In this manner, the imaging unit 104 can accurately image the subject S even after flip-up.

Note that, in the above description, a method for controlling the inclination of the imaging unit 104 in a case where the image display unit 102 is positioned from the first position P1 to the second position P2 has been described as an example, but the HMD 100 of the present exemplary embodiment can accurately image the subject S by controlling the inclination of the imaging unit 104 even when the image display unit 102 is positioned from the second position P2 to the first position P1.

As described above, according to the HMD 100 of the present exemplary embodiment, even when the position of the imaging unit 104 changes before and after the flip-up, the imaging unit 104 can be tilted toward the subject S side to correct the position of the imaging unit 104 and the subject S by driving the driving unit 106. In this manner, since the imaging unit 104 continues to accurately image the subject S to work by the worker M even before and after the flip-up, it is possible to image the same external scene before and after the flip-up.

Therefore, according to the HMD 100 of the present exemplary embodiment, even when the worker M flips up and moves the image display unit 102 to the second position P2 (flip-up) in order to secure the field of view, the external scene imaged by the imaging unit 104 does not change before and after the flip-up.

Therefore, even when the image display unit 102 is flipped up, the operator can accurately grasp the subject S to work by the worker M based on the external scene imaged by the imaging unit 104, so that the operator can continue to provide an appropriate work instruction to the worker M.

Thus, the HMD 100 of the present exemplary embodiment can provide a high-value-added head-mounted display that does not inhibit the assistance of the operator even when the position of the image display unit 102 changes.

Additionally, in the case of the present exemplary embodiment, the coupling unit 105 rotates about a rotational axis extending in the left-right direction Y, and thus changes the position of the image display unit 102 with respect to the mounting unit 101 in the vertical direction Z.

According to this configuration, it is possible to realize a configuration in which the image display unit 102 is rotated via the coupling unit 105 to easily change the position of the image display unit 102 with respect to the mounting unit 101.

Furthermore, in the case of the present exemplary embodiment, the coupling unit 105 includes the first linkage portion 105a that is rotatably linked to the mounting unit 101 about the first rotational shaft O1 extending in the left-right direction Y, and the second linkage portion 105b that is rotatably linked to the frame 103 about the second rotational shaft O2 extending in the left-right direction Y.

According to this configuration, since the image display unit 102 rotates about the second rotational shaft O2 with respect to the coupling unit 105, the movement amount of the imaging unit 104 in the vertical direction Z before and after the flip-up can be suppressed. Thus, it is possible to suppress the adjustment amount of the angle of the imaging unit 104 before and after the flip-up.

In the present exemplary embodiment, the coupling unit 105 changes the position of the image display unit 102 with respect to the mounting unit 101 between the first position P1 on the one side in the vertical direction Z and the second position P2 on the other side in the vertical direction Z.

According to this configuration, the coupling unit 105 moves the image display unit 102 between the first position P1 and the second position P2, so that a configuration can be realized that makes the flip-up operation easily possible.

In the case of the present embodiment, the controller 110 drives the driving unit 106 to tilt the imaging unit 104 by an angle equal to or greater than θ defined by Mathematical Equation 1 above.

According to this configuration, by calculating the inclination angle of the imaging unit 104 based on the above equation, it is possible to easily and accurately adjust the inclination angle of the imaging unit 104.

In the case of the present exemplary embodiment, the position detection unit 107 is further provided for detecting a change in the position of the image display unit 102 with respect to the mounting unit 101, and the controller 110 tilts the imaging unit 104 based on the detection result of the position detection unit 107.

According to this configuration, it is possible to detect that the image display unit 102 has been flipped up by the position detection unit 107. Further, the inclination control of the imaging unit 104 can be performed only when the position detection unit 107 detects that the image display unit 102 has been flipped up.

Second Exemplary Embodiment

Hereinafter, an HMD according to a second exemplary embodiment of the present disclosure will be described. The difference between the present exemplary embodiment and the first exemplary embodiment is the configuration and position of the coupling unit that couples the mounting unit 101 and the frame 103, and the other configurations are common therebetween. Therefore, in the following description, members and configurations common to those of the first embodiment are denoted by the same reference numerals, and detailed description thereof will be omitted.

Figure 5:
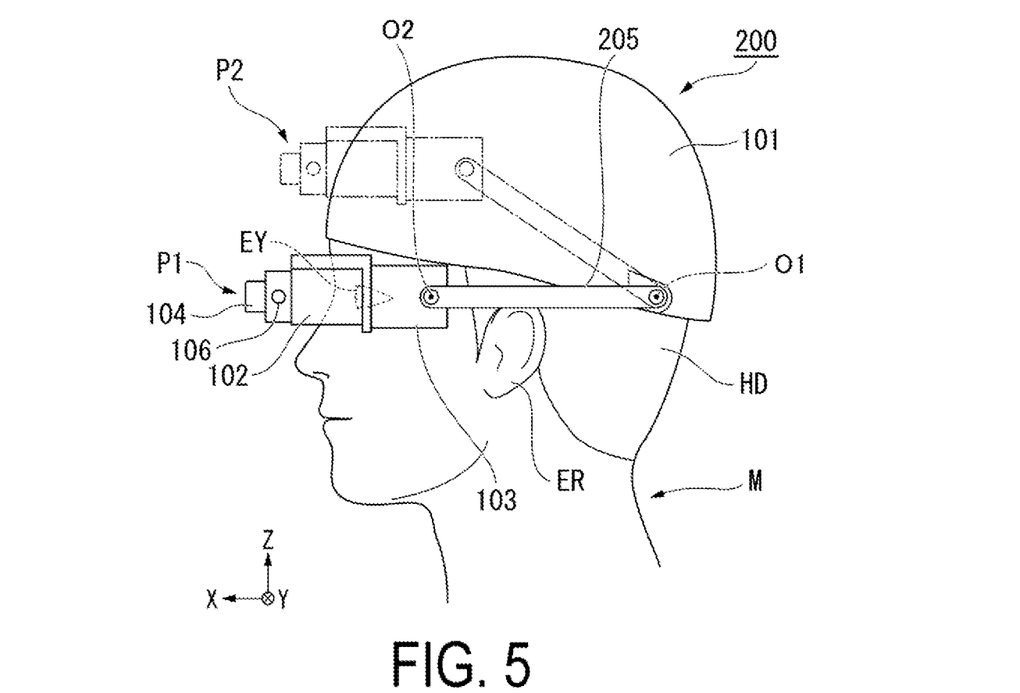
FIG. 5 is a diagram illustrating a usage state of an HMD of a second exemplary embodiment.

FIG. 5 is a diagram illustrating a usage state of the HMD of the second exemplary embodiment. In FIG. 5, in a state in which the HMD is worn on the head HD of the worker M, the state in which the image display unit 102 is flip-up is indicated by a two dot chain line.

As illustrated in FIG. 5, an HMD 200 of the present exemplary embodiment includes the mounting unit 101, the image display unit 102, the frame 103, the imaging unit 104, a coupling unit 205, and the driving unit 106.

Figure 6:
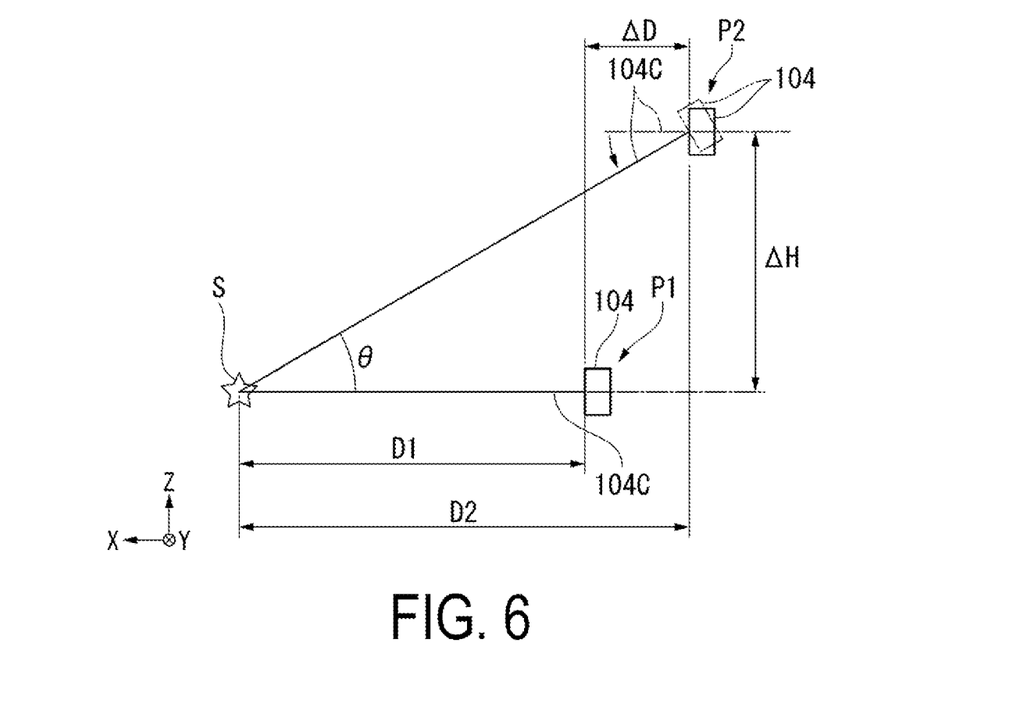
FIG. 6 is a diagram illustrating a change in a position of the imaging unit before and after flip-up.

FIG. 6 is a diagram illustrating a change in the position of the imaging unit 104 before and after the flip-up of the HMD 200 according to the present exemplary embodiment.

In FIG. 6, when the image display unit 102 is located at the first position P1 (before the flip-up), the distance from the imaging unit 104 to the subject S to work by the worker M is D1. In the present exemplary embodiment, for example, the distance D1 is 0.5 m. Further, when the image display unit 102 is located at the second position P2 (after the flip-up), the distance from the imaging unit 104 to the subject S is D2.

Further, when the position of the image display unit 102 changes from the first position P1 to the second position P2 (before and after the flip-up), a positional change amount of the imaging unit 104 in the vertical direction Z is ΔH. The positional change amount ΔH is a constant determined in accordance with a design value of the HMD 200.

Further, a positional change amount in the front-rear direction X of the imaging unit 104 before and after the flip-up is ΔD. The positional change amount ΔD is a constant determined in accordance with the design value of the HMD 200.

Additionally, in FIG. 6, an angle formed between the imaging unit 104 and the subject S after the flip-up is θ. Note that in FIG. 6, for ease of explanation, the inclination of the central optical axis 104C of the imaging unit 104 is not changed before and after the flip-up. That is, as illustrated in FIG. 6, before and after the flip-up, the central optical axis 104C of the imaging unit 104 is assumed to be parallel to the front-rear direction X.

As illustrated in FIG. 5, in the coupling unit 205 of the present embodiment, the linkage portion with the mounting unit 101 is positioned on the rear side, as compared to the first exemplary embodiment. Specifically, the coupling unit 205 is located rearward (−X side) than the ear ER of the worker M.

Therefore, the HMD 200 according to the present exemplary embodiment has a state in which the imaging unit 104 is retracted to the rear side (−X side) during the flip-up due to its structure.

That is, as illustrated in FIG. 6, the positional change amount ΔD in the front-rear direction X of the imaging unit 104 before and after the flip-up is a positive value, that is, "ΔD=+D". Therefore, the distance D2 from the imaging unit 104 to the subject S after the flip-up is defined by "D2=D1+D".

According to the HMD 200 of the present exemplary embodiment, the controller 110 can calculate the angle θ from the above equation 1 based on the distance D2 (D1+D) from the imaging unit 104 to the subject S after the flip-up and the value of the positional change amount ΔH. For example, the distance change amount ΔD is 0.02 m, and the positional change amount ΔH is 0.07 m. That is, the distance D2 is 0.52 m. In this case, the controller 110 calculates the angle θ as "7.67°" drives the driving unit 106, and tilts the imaging unit 104 by the angle θ.

In the HMD 200 according to the present exemplary embodiment, even when the position of the imaging unit 104 changes upward and rearward, before and after the flip-up, the positions of the imaging unit 104 and the subject S can be corrected by calculating the angle θ at which the imaging unit 104 is tilted. Thus, since the imaging unit 104 continues to accurately image the subject S before and after the flip-up, it is possible to image the same external scene before and after the flip-up.

Note that in the first exemplary embodiment and the second exemplary embodiment, as illustrated in FIGS. 3 and 6, the orientation of the central optical axis 104C of the imaging unit 104 does not change before and after the flip-up. That is, before and after the flip-up, both the central optical axis 104C of the imaging unit 104 is assumed to be parallel to the front-rear direction X.

Since the image display unit 102 is a relatively heavy member, it is desirable that the worker M does not feel the weight of the image display unit 102 as much as possible during the flip-up. For example, a configuration may be employed in which the image display unit 102 is tilted diagonally upward so that the weight of the image display unit 102 is applied to the rear side of the mounting unit 101 during the flip-up.

Figure 7:
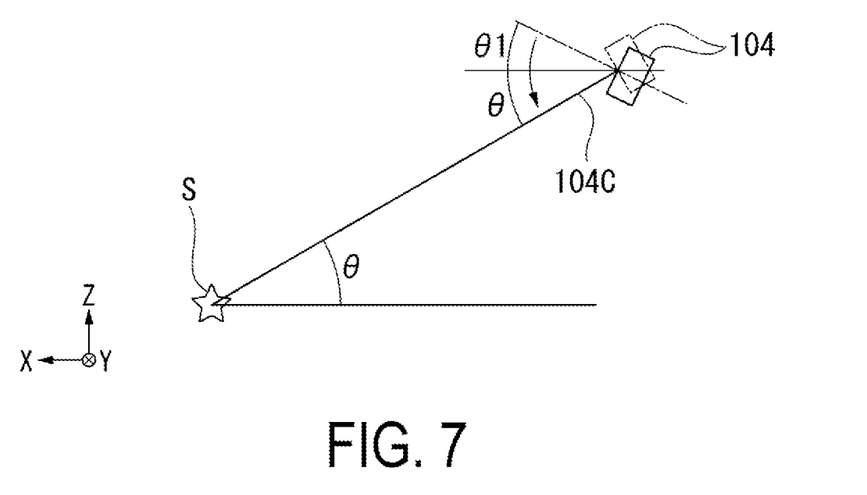
FIG. 7 is a diagram illustrating a configuration in which the image display unit faces diagonally upward during the flip-up.

FIG. 7 is a diagram illustrating a configuration in which the image display unit 102 faces diagonally upward during the flip-up. When the image display unit 102 faces diagonally upward during the flip-up, as illustrated in FIG. 7, the central optical axis 104C of the imaging unit 104 is also in a state of facing diagonally upward.

In FIG. 7, an angle formed between the central optical axis 104C of the imaging unit 104 and the front-rear direction X along the XY plane along the horizontal plane is denoted as θ1. Here, the angle θ1 corresponds to the change amount in the orientation of the imaging unit 104 after the flip-up (the change amount in the inclination diagonally upward). Note that, although the angle θ1 illustrated in FIG. 7 is appropriately set based on the design value of the coupling structure between the coupling unit and the mounting unit, it is generally desirable to set the angle θ1 to the range of 0° to 45°. Alternatively, by using the gyro sensor as the position detection unit 107, the change amount in the angle of the imaging unit 104 (the angle θ1) after the flip-up may be calculated.

In a case where the image display unit 102 faces diagonally upward during the flip-up in this manner, it is desirable that the controller 110 tilts the imaging unit 104 based on the change amount of the orientation of the imaging unit 104, that is, the change amount of the inclination in the diagonally upward direction.

That is, in consideration of the angle θ1, which is the change amount in the orientation of the imaging unit 104, the controller 110 sets the inclination angle of the imaging unit 104 in step SS3.

For example, in a case where θ1 is 45°, the controller 110 controls the driving unit 106 to tilt the imaging unit 104 downward by an angle (θ+θ1) obtained by adding the angle θ1 to the angle θ calculated from Mathematical Equation 1 described above.

By tilting the imaging unit 104 by an angle in consideration of the angle θ1 in this manner, even in a configuration in which the image display unit 102 faces diagonally upward during the flip-up, it is possible to accurately image the subject S to work by the worker M even before and after the flip-up.

Note that, instead of controlling the inclination of the imaging unit 104 by the amount of inclination diagonally upward as illustrated in FIG. 7, the controller 110 may perform control to tilt the imaging unit 104 at an angle greater than the angle θ calculated from Mathematical Equation 1 described above. According to this configuration, since the imaging unit 104 is tilted downward more than the angle θ in the case where the inclination in the diagonally upward direction does not occur, even when the inclination amount in the diagonally upward direction of the imaging unit 104 during the flip-up is unknown, it is easy to direct the imaging unit 104 toward the subject S side on which the worker M works.

Third Exemplary Embodiment

Hereinafter, an HMD according to a third exemplary embodiment of the present disclosure will be described. The difference between the present exemplary embodiment and the above exemplary embodiment is the configuration and position of the coupling unit that couples the mounting unit 101 and the frame 103, and the other configurations are common therebetween. Therefore, in the following exemplary description, members and configurations common to those of the above embodiment are denoted by the same reference numerals, and detailed description thereof will be omitted.

In the exemplary embodiment described above, a case in which the image display unit 102 moves from the first position P1 to the second position P2 by rotating in the vertical direction Z has been described as an example, but the image display unit 102 may move from the first position to the second position by sliding in the vertical direction Z.

Figure 8:
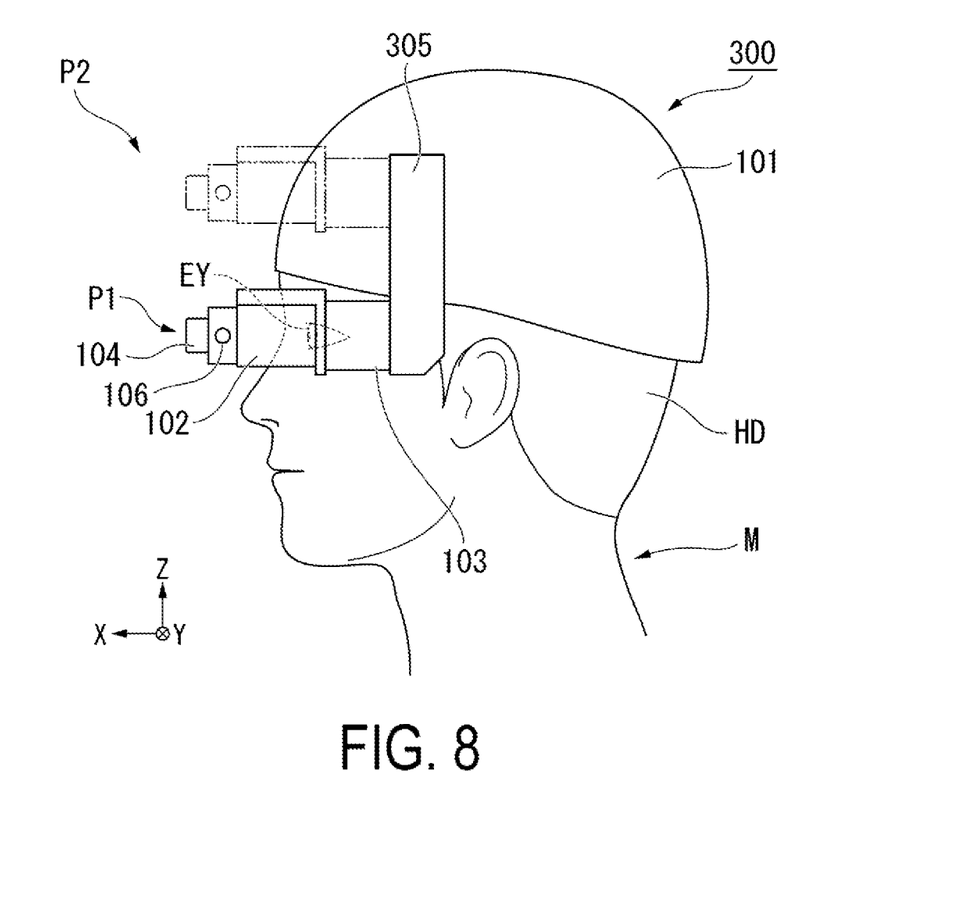
FIG. 8 is a diagram illustrating a usage state of an HMD of a third exemplary embodiment.

FIG. 8 is a diagram illustrating a usage state of an HMD of the present exemplary embodiment. In FIG. 8, in a state in which the HMD is worn on the head HD of the worker M, the state in which the image display unit 102 is flip-up is indicated by a two dot chain line.

As illustrated in FIG. 8, an HMD 300 of the present exemplary embodiment includes the mounting unit 101, the image display unit 102, the frame 103, the imaging unit 104, a coupling unit 305, and the driving unit 106.

In the HMD 300 of the present exemplary embodiment, the coupling units 305 are provided on both sides of the mounting unit 101 in the left-right direction Y. The coupling unit 305 slidably supports both sides of the frame 103 in the left-right direction Y in the vertical direction Z.

Based on such a configuration, the image display unit 102 moves from the first position P1 to the second position P2 by sliding in the vertical direction Z.

In the case of the present exemplary embodiment, due to its configuration, the orientation of the central optical axis 104C of the imaging unit 104 does not change before and after the flip-up, and the position of the imaging unit 104 in the front-rear direction X does not change.

That is, in the case of the present exemplary embodiment, the positional change amount ΔD in the front-rear direction X of the imaging unit 104 before and after the flip-up is 0, that is, "ΔD=0". Therefore, in the case of the present exemplary embodiment, in the above Mathematical Equation 1, the distance D2 from the imaging unit 104 after the flip-up to the subject S to work by the worker M is defined by D2=D1.

According to the HMD 300 of the present exemplary embodiment, the controller 110 can calculate the angle θ from the above equation 1 based on the distance D2 (D1) from the imaging unit 104 to the subject S after flip-up and the value of the positional change amount ΔH. For example, the positional change amount ΔH is 0.07 m. The distance D2 is 0.5 m. In this case, the controller 110 calculates the angle θ as "7.97°", drives the driving unit 106, and tilts the imaging unit 104 by the angle θ.

In the HMD 300 according to the present exemplary embodiment, even when the position of the imaging unit 104 changes upward, before and after the flip-up, the positions of the imaging unit 104 and the subject S can be corrected by the controller 110 calculating the angle θ at which the imaging unit 104 is tilted. Therefore, since the imaging unit 104 can continue to accurately image the subject S to work by the worker M before and after the flip-up, it is possible to image the same video before and after the flip-up.

Note that the technical scope of the present disclosure is not limited to the above-described embodiments, and various modifications can be made to the above-described embodiments without departing from the spirit and gist of the present disclosure.

For example, in the exemplary embodiment described above, a case in which the image display unit 102 moves from the first position P1 to the second position P2 by rotating in the vertical direction Z (rotating within the XZ plane) has been described as an example, but the present disclosure can also be applied to a configuration in which the image display unit 102 moves from the first position P1 to the second position P2 by rotating in the left-right direction Y (rotating within the XY plane).

Additionally, in the exemplary embodiments described above, a case in which the distance D1 from the imaging unit 104 to the subject S to work by the worker M before the flip-up is calculated using the focus function of the imaging unit 104 on the subject S has been described as an example, but the calculation method of the distance D1 is not limited thereto. For example, the distance D1 may be calculated by measuring the distance between the subject S and the imaging unit 104 using a TOF sensor, etc., installed in the frame 103.

Furthermore, the specific configuration such as the number, arrangement, shape, and material of the various components that constitute wearable display devices is not limited to the above-mentioned exemplary embodiments, and may be suitably changed.

The wearable display device according to the aspect of the present disclosure may have the following configuration.

The wearable display device according to an aspect of the present disclosure includes a mounting unit, an image display unit configured to display an image, a frame configured to support the image display unit, an imaging unit supported by the frame and configured to image an external scene, a driving unit configured to tilt the imaging unit with respect to the frame, a coupling unit configured couple the frame and the mounting unit such that a position of the image display unit with respect to the mounting unit is changeable in a first direction, and a control unit configured to control an inclination of the imaging unit based on the position of the image display unit with respect to the mounting unit, wherein the control unit is configured to drive the driving unit so that when the position of the image display unit with respect to the mounting unit is changed from one side to another side in a first direction, the imaging unit is tilted toward the one side in the first direction.

In the wearable display device of one aspect of the present disclosure, the coupling unit may be configured to change the position of the image display unit with respect to the mounting unit in the first direction by rotating about a rotational axis extending in a second direction orthogonal to the first direction.

In the wearable display device of one aspect of the present disclosure, the coupling unit may include a first linkage portion that is rotatably linked to the mounting unit about a first rotational shaft extending in the second direction, and a second linkage portion that is rotatably linked to the frame about a second rotational shaft extending in the second direction.

In the wearable display device of one aspect of the present disclosure, the coupling unit may be configured to change the position of the image display unit with respect to the mounting unit between a first position on the one side in the first direction and a second position on the other side in the first direction.

In the wearable display device according to one aspect of the present disclosure, the control unit may be configured to drive the driving unit to tilt the imaging unit by an angle θ or greater, the angle θ being defined by the above Mathematical Equation 1, wherein D1 is a distance from the imaging unit to a subject included in the external scene when the image display unit is located at the first position, D2 is a distance from the imaging unit to the target subject when the image display unit is located at the second position, ΔH is a positional change amount of the imaging unit in the first direction when the image display unit moves from the first position to the second position, and ΔD is a positional change amount of the imaging unit in a third direction orthogonal to the first direction when the image display unit moves from the first position to the second position. Here, D2=D1+ΔD.

In the wearable display device of one aspect of the present disclosure, when the image display unit moves from the first position to the second position, the control unit may be configured to tilt the imaging unit to the one side in the first direction based on a change amount in an orientation of the imaging unit.

In the wearable display device of one aspect of the present disclosure, the imaging unit may have a focus function, and may be configured to acquire a distance D1 from the imaging unit to the subject using the focus function.

In the wearable display device of one aspect of the present disclosure, the position detection unit may be further provided for detecting a change in the position of the image display unit with respect to the mounting unit, and the control unit may be configured to cause the driving unit to tilt the imaging unit based on the detection result of the position detection unit.

What is claimed is:

1. A wearable display device comprising:
a mounting unit;
an image display unit that displays an image;
a frame that supports the image display unit;
an imaging unit that is supported by the frame and that captures an external scene;
a coupling unit that connects the frame and the mounting unit in a manner that a position of the image display unit with respect to the mounting unit changes from one side to another side in a first direction; and
a driving unit that changes an angle of the imaging unit to tilt the imaging unit toward the one side in the first direction when the position of the image display unit is changed from the one side to the other side in the first direction, wherein
the coupling unit is configured to change the position of the image display unit with respect to the mounting unit between a first position on the one side in the first direction and a second position on the other side in the first direction,
the driving unit is configured to tilt the imaging unit by an angle θ or greater, the angle θ being defined by a following equation:

$$\theta = \cos^{-1}\left(\frac{(D1 + \Delta D)}{\sqrt{D2^2 + \Delta H^2}}\right)$$

wherein D1 is a distance from the imaging unit to a target subject included in the external scene when the image display unit is located at the first position,
D2 is a distance from the imaging unit to the target subject when the image display unit is located at the second position,
ΔH is a change amount of a position of the imaging unit in the first direction when the image display unit moves from the first position to the second position, and
ΔD is a change amount of a position of the imaging unit in a third direction intersecting the first direction when the image display unit moves from the first position to the second position.

2. The wearable display device according to claim 1, wherein
the coupling unit changes the position of the image display unit with a second direction as a rotational axis, the second direction intersecting the first direction.

3. The wearable display device according to claim 2, comprising:
a first rotational shaft that extends along the second direction; and
a second rotational shaft that extends along the second direction, wherein
the coupling unit includes:
a first linkage portion rotates the mounting unit with the first rotational shaft as the rotational axis, and
a second linkage portion rotates the frame with the second rotational shaft as the rotational axis.

4. The wearable display device according to claim 1, wherein
when the image display unit moves from the first position to the second position,
the driving unit tilts the imaging unit to the one side in the first direction based on a change amount in an orientation of the imaging unit.

5. The wearable display device according to claim 1, wherein
   the imaging unit has a focus function, and acquires the distance D1 from the imaging unit to the target subject using the focus function.

6. The wearable display device according to claim 1, comprising a position detection unit that detects a change in a position of the image display unit with respect to the mounting unit, wherein
   the driving unit changes an angle of the imaging unit to tilt the imaging unit based on a detection result of the position detection unit.

* * * * *